United States Patent

Uemura et al.

[11] Patent Number: 6,035,242
[45] Date of Patent: Mar. 7, 2000

[54] BENDING SIMULATION METHOD

[75] Inventors: Gen Uemura; Naomichi Mori, both of Kanagawa, Japan

[73] Assignee: Amada Metrecs Company, Limited, Kanagawa, Japan

[21] Appl. No.: 08/994,488

[22] Filed: Dec. 19, 1997

[30] Foreign Application Priority Data

| Jul. 7, 1997 | [JP] | Japan | P9-181470 |
| Jul. 14, 1997 | [JP] | Japan | P9-188646 |
| Aug. 4, 1997 | [JP] | Japan | P9-209148 |
| Aug. 4, 1997 | [JP] | Japan | P9-209159 |

[51] Int. Cl.$^7$ .............................. G06F 19/00; G06F 3/00
[52] U.S. Cl. ...................... 700/97; 700/165; 395/500.01; 395/500.27; 264/40.1; 264/40.5
[58] Field of Search .................... 264/40.1, 40.5, 264/285, 295, 319, 320, 339; 364/488, 489, 578, 468.03, 474.07; 72/702; 700/97, 165; 395/500.1, 500.27

[56] References Cited

U.S. PATENT DOCUMENTS

| 4,802,357 | 2/1989 | Jones | 72/389 |
| 4,864,509 | 9/1989 | Somerville et al. | 364/476 |
| 5,046,852 | 9/1991 | Hametner et al. | 356/398 |
| 5,377,116 | 12/1994 | Wayne et al. | 364/474.17 |
| 5,519,623 | 5/1996 | Pourboghrat | 364/474.07 |
| 5,603,236 | 2/1997 | Hongo | 72/319 |
| 5,661,671 | 8/1997 | Ooenoki et al. | 364/578 |
| 5,729,462 | 3/1998 | Newkirk et al. | 364/468.03 |
| 5,842,366 | 12/1998 | Klingel et al. | 72/31.1 |

FOREIGN PATENT DOCUMENTS

| 59-47024 | 3/1984 | Japan . |
| 1-309726 | 12/1989 | Japan . |
| 1-309728 | 12/1989 | Japan . |
| 4-238631 | 8/1992 | Japan . |

*Primary Examiner*—Jan H. Silbaugh
*Assistant Examiner*—Michael Poe
*Attorney, Agent, or Firm*—Greenblum & Bernstein, P.L.C.

[57] ABSTRACT

The target stroke amount calculation portion obtains an initial value of the target stroke amount of a punch according to bending information including workpiece condition of a workpiece to be bent, tool condition, target folding angle, and the like. The bending information setting portion sets the bending information in the workpiece bending simulation processing portion, in a specified form. The element breakdown calculation portion divides workpiece sectional image according to the bending information to a plurality of major portions and further divides these portions to detailed portions. The workpiece bending simulation processing portion virtually deforms the workpiece according to elastoplasticity finite element method corresponding to a virtual descent of the punch by the target stroke amount and obtains workpiece deformation image after a spring-back. The target stroke amount determining portion the folding angle of a deformation image with the target folding angle so as to determine whether or not both of them coincide with each other. If the folding angle of the deformation image does not coincide with the target folding angle, the stroke amount correcting portion determines a new target stroke amount and sets it in the workpiece bending simulation processing portion.

5 Claims, 11 Drawing Sheets

WORKPIECE NIPPING ANGLE = $\theta m$

WORKPIECE ANGLE AFTER SPRING - BACK = $\theta i$

BENDING SIMULATION METHOD

BACKGROUND OF THE INVENTION

1. Field of the Invention

This invention relates to a bending simulation method for automatically obtaining a stroke of an optimum punch for obtaining a target bending angle by simulation without actual trial bending by a bending machine and an apparatus therefor.

2. Description of the Prior Art

FIG. 1 is a schematic structure diagram of a production line control system for bending machines. The production line control system for the bending machine shown in FIG. 1 comprises a centralized station 1, a CAE apparatus 2, an automatic programming apparatus 3 and an NC apparatus 5 for controlling the bending machine 4, these components being connected through LAN.

Generally, in V-shape bending, spring-back occurs when bending load is released. Thus, in the production line control system for the bending machine shown in FIG. 1, when an operator instructs a bending elongation amount for a position to be bent by an automatic programming apparatus 3, he enters workpiece condition, tool condition, target Di value which is a stroke amount of punch and the like (hereinafter generally referred to as bending information) shown in FIG. 2 through the CAE apparatus 2, so as to carry out simulation of sheet material formation considering the spring-back.

As shown in FIG. 2, the workpiece condition includes sheet thickness, Young's modulus of elasticity, Poisson's ratio, yield strength, processing hardness index and the like. The tool condition includes die groove width Vd, die radius, die groove angle, punch tip radius, tip angle, punch width Vp and the like.

When, in a simulation screen of the automatic programming apparatus 3, a deformation angle of workpiece sectional image after a spring-back reaches a target folding angle (hereinafter referred to as target angle), the operator inputs the bending information such as the target Di value, bending elongation amount, processing load and the like.

Then, according to this filed bending information, V-shape bending NC program is produced and transmitted to the centralized station 1 or NC machine so as to start processing.

In this simulation calculation used in this CAE apparatus 2, generally workpiece deformation shape after the spring-back is obtained by using elastoplasticity finite-element method (hereinafter referred to as finite-element method) capable of treating elastic restoration when loading weight is released.

As shown in FIG. 3A, the automatic programming apparatus 3 displays the workpiece sectional image 11, the die sectional image 12 and the punch sectional image 13. And until the target Di value is reached, it descends the punch sectional image 13 and displays the workpiece sectional image 14 in which the workpiece sectional image is deformed as shown in FIG. 3B by the finite-element method. According to this finite-element method, mesh division (element decomposition) of workpiece is carried out so as to deform the image.

Next, when the punch sectional image 13 is descended to reach the target Di value, the workpiece deformation image after the spring-back is obtained by the finite-element method and displayed as shown in FIG. 3C.

If the workpiece shape after the spring-back is not formed at the target angle, the operator corrects and enters the initial target Di value so as to perform the previously described workpiece again.

However, the bending simulation according to the conventional finite-element method has such a problem that the number of workpiece steps which the operator must do increases, because if the workpiece deformation angle after the spring-back have not reached its target angle, the operator must calculate and enter the initial target Di value again.

The initial target Di value must be set taking an occurrence of the spring-back into account. Thus, to set new initial target Di value, a worker not skilled in V-shape bending and having no high level know-how cannot set the new initial target Di value easily.

Further, the conventional art has another problem that in the V-shaped bending, the actual target angle bending may not be attained depending on the conditions.

On the other hand, upon simulation, mesh division of dividing the workpiece into elements is carried out by an operator based on punch shape, workpiece shape and the like. This mesh division is often set with the same intervals.

However, because generation of the mesh is carried out by an operator, there are following problems which must be solved.

(1) In the case when the mesh intervals are the same, there is a problem that deformation of a contact point between the workpiece and the punch is different from the actual one if the contact point is insufficient.

(2) Even if a sufficient contact point is entered, the mesh at the same intervals has a problem that the calculation according to the infinite-element method takes a so long time.

SUMMARY OF THE INVENTION

Accordingly, the present invention has been proposed to solve the aforementioned problems. It is an object of the present invention to provide a simulation method wherein upon simulation for bending, an initial stroke amount of a punch is automatically calculated so as to replace the stroke amount of simulation for bending therewith and which is free of wasting time, and an apparatus therefor.

Another object thereof is to provide a simulation method for bending wherein simulation steps of bending are made to coincide with actual ones and calculation time according to finite-element method can be reduced, and an apparatus therefor.

To solve the aforementioned object, there is provided a simulation method for bending, comprising the steps of: setting workpiece condition of a workpiece to be bent, tool condition and target folding angle; obtaining an initial value of a target stroke amount of a punch according to the workpiece condition, tool condition and target folding angle; deforming the workpiece virtually according to elastoplasticity finite-element method following the workpiece condition, tool condition and target folding angle, corresponding to virtual descent of the punch by the target stroke amount, and obtaining a deformation image of the workpiece after a spring-back; determining whether or not folding angle of the deformation image coincides with the target folding angle by comparing the two angles; and outputting information including the target stroke amount, spring-back amount, applied pressure and deformation part shape.

According to a preferred embodiment of the present invention, when the folding angle of the deformation image does not coincide with the target folding angle, in workpiece linear data showing a relation between the target stroke amount and the folding angle of the deformation image under the target stroke amount, an intersection between a straight line obtained by differentiating at a point corresponding to the target stroke amount of this time and the target folding angle is obtained and a value located between a target stroke amount corresponding to the intersection and the target stroke amount of this time is set as a new target stroke amount so as to obtain the deformation image.

According to another preferred embodiment of the present invention, a middle point between the target stroke amount corresponding to the intersection between the straight line obtained by differentiating at the point corresponding to the target stroke amount of this time, and the target folding angle, and the target stroke amount of this time is set as the new target stroke amount.

According to still another preferred embodiment of the present invention, when a folding angle corresponding to the middle point deviates from the target folding angle, a middle point between the target stroke amount of this time and the middle point is set as the new target stroke amount.

According to a further embodiment of the present invention, after the step for obtaining the initial value of the target stroke amount of the punch, there are provided further steps of: deforming the workpiece by descending the punch temporarily up to the target stroke amount virtually; and in a workpiece deformation image, dividing the workpiece to a portion which is subject to violent deformation, a portion which is in contact with a die shoulder, a portion extending between the portion which is subject to violent deformation and the portion which is in contact with the die shoulder, and an excessive portion; and dividing the portion which is subject to violent deformation by multiplying a circumferential length of a punch tip with a coefficient so as to correspond to the deformation; dividing the portion which is in contact with the die shoulder to a size of circumferential length divided by 3 so as to correspond to rolling/sliding contact with the die shoulder radius; and dividing the portion between the portion which is subject to violent deformation and the portion which is in contact with the die shoulder to gradation like mesh, so as to prevent an occurrence of concentration of stress in terms of calculation, due to an excessive difference of the division width between the portion which is subject to violent deformation and the portion which is in contact with the die shoulder.

To achieve the aforementioned object, there is provided a bending simulation apparatus comprising: a target stroke amount calculation portion for obtaining an initial value of a target stroke amount of a punch according to workpiece condition of a workpiece to be bent, tool condition and target folding angle; a workpiece bending simulation portion for deforming the workpiece virtually according to elastoplasticity finite-element method following the workpiece condition, tool condition and target folding angle, corresponding to virtual descent of the punch by the target stroke amount, and obtaining a deformation image of the workpiece after a spring-back; a target stroke amount determining portion for determining whether or not a folding angle of the deformation image coincides with the target folding angle by comparing the two angles; and a stroke amount correcting portion for, when the folding angle of the deformation image does not coincide with the target folding angle, determining a new target stroke amount and setting the new target stroke amount in the workpiece bending simulation portion.

According to a preferred embodiment of the present invention, when the folding angle of the deformation image does not coincide with the target folding angle, the stroke amount correcting portion obtains an intersection between a straight line obtained by differentiating at a point corresponding to the target stroke amount of this time and the target folding angle, in workpiece linear data showing a relation between the target stroke amount and the folding angle of the deformation image under the target stroke amount. The stroke amount correcting portion then determines a value located between a target stroke amount corresponding to the intersection point and the target stroke amount of this time, as a new target stroke amount so as to set the new target stroke amount in the workpiece bending simulation portion. The workpiece bending simulation portion obtains the deformation image again according to the newly set target stroke amount.

According to another preferred embodiment of the present invention, the stroke amount correcting portion sets a middle point between the target stroke amount corresponding to the intersection between the straight line obtained by differentiating at the point corresponding to the target stroke amount of this time and the target folding angle, and the target stroke amount of this time, as the new target stroke amount.

According to still another preferred embodiment of the present invention, the stroke amount correcting portion, when a folding angle corresponding to the middle point deviates from the target folding angle, sets a middle point between the target stroke amount of this time and the middle point, as the new target stroke amount.

According to a further preferred embodiment of the present invention, there is further provided an element breakdown calculation portion for: deforming the workpiece by descending the punch temporarily up to the target stroke amount virtually according to the workpiece condition, tool condition and target folding angle; and in a workpiece deformation image, dividing the workpiece to a portion which is subject to violent deformation, a portion which is in contact with a die shoulder, a portion extending between the portion which is subject to violent deformation and the portion which is in contact with the die shoulder, and an excessive portion; and dividing the portion which is subject to violent deformation by multiplying a circumferential length of a punch tip with a coefficient so as to correspond to the deformation; dividing the portion which is in contact with the die shoulder to a size of circumferential length divided by 3 so as to correspond to rolling/sliding contact with the die shoulder radius; and dividing the portion between the portion which is subject to violent deformation and the portion which is in contact with the die shoulder to gradation like mesh, so as to prevent an occurrence of concentration of stress in terms of calculation, due to an excessive difference of the division width between the portion which is subject to violent deformation and the portion which is in contact with the die shoulder.

The nature, principle and utility of the invention will become more apparent from the following detailed description when read in conjunction with the accompanying drawings.

DETAILED DESCRIPTION OF THE PREFERRED EMBODIMENTS

Figure 4:
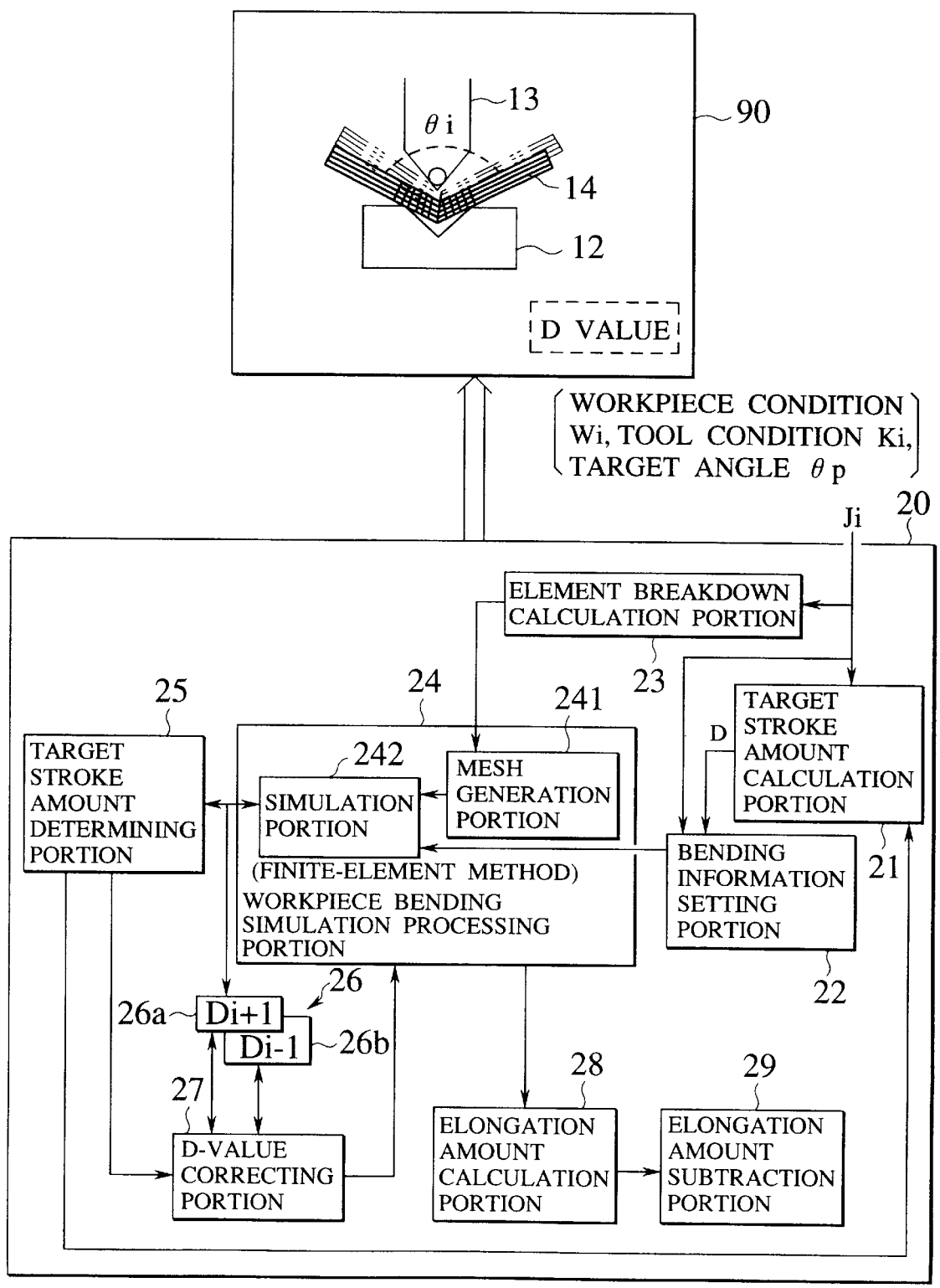
FIG. 4 is a schematic structure diagram of an embodiment of a bending simulation apparatus according to the present invention.

FIG. 4 is a schematic structure diagram of an embodiment of a bending simulation apparatus according to the present invention. A simulation apparatus shown in FIG. 4 is a function to be incorporated in an automatic programming apparatus.

This simulation apparatus 20 indicates workpiece sectional image (FIG. 3A) 11, die sectional image 12, and punch sectional image 13 on its display unit 90 after the target D value is automatically obtained according to bending information including workpiece condition Wi, tool condition Ki, target angle θi and the like entered by an operator. Then, the sectional image 13 of the punch is gradually descended until the target D value is reached and a deformation image 14 of a workpiece obtained using finite-element method is displayed on the display unit 90.

Then, when the target D value is reached and then the punch sectional image 13 is released, a spring-back occurs (loading weight is released). At this time, whether or not the angle θp of a workpiece sectional image 14 has reached its target angle θi is determined, and if both angles are not coincident with each other, a new target D value is automatically calculated and the former D value is changed to this new target D value.

When both angles coincide with each other, the D value at the target angle is calculated. A method for calculating the D value at this target angle will be described below.

This simulation apparatus 20, as shown in FIG. 4, comprises a target stroke amount calculation portion 21, a bending information setting portion 22, an element breakdown calculation portion 23, a workpiece bending simulation processing portion 24, a target stroke amount determining portion 25, memories 26a, 26b, a D-value correcting portion 27, an elongation amount calculation portion 28, and an elongation amount subtraction portion 29. The workpiece bending simulation processing portion 24 contains a mesh generation portion 241 and a simulation portion 242.

Figure 5:
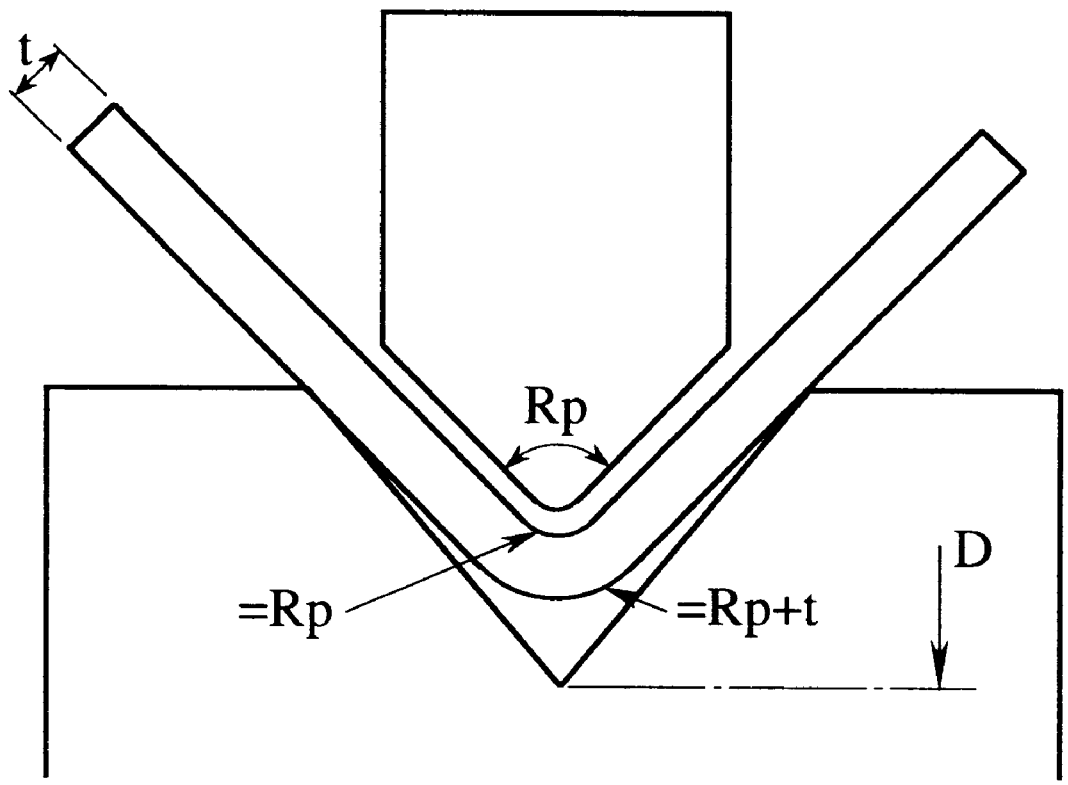
FIG. 5 is a diagram for explaining a calculation of the D value.

The target stroke amount calculation portion 21 assumes, for example, a material sheet after deformation shown in FIG. 5 have an inside radius equal to the punch tip radius R and obtains the D value (or called target stroke amount) of a target angle and outputs it to the bending information setting portion 22. That is, this portion obtains the D value of the target angle geometrically from input condition. If it is notified that the target angle has not been reached, it causes the respective conditions to be entered again so as to obtain a new target D value.

The bending information setting portion 22 modifies bending information entered by an operator to a specified format and sets it in the workpiece bending simulation processing portion 24.

The element breakdown calculation portion 23 divides the workpiece sectional image 11 into plural major portions according to workpiece condition, tool condition and the like, and further divides these plural portions into detailed portions. This element breakdown calculation portion 23 will be described in detail below.

The mesh generation portion 241 determines intervals for drawing horizontal lines depending on the thickness of the workpiece sectional image 11. After the horizontal lines are drawn according to this interval, a mesh is generated by connecting division points of the upper side of the workpiece sectional image 11 obtained by the element breakdown calculation portion 23 with division points of the lower side and displayed in the workpiece sectional image 11, and further the generated mesh data is outputted to the simulation portion 242.

The simulation portion 242 descends the punch sectional image 13 according to the bending information Ji and target D value so as to deform the workpiece image. Then, when the set target D value is reached, the punch sectional image is released and a workpiece deformation image 15 after a spring-back is obtained and displayed.

The target stroke amount determining portion 25 successively reads the θi values as the simulation portion 242 descends the punch according to the target D value, and determines whether or this θi value has reached its target value.

The D-value correcting portion 27 stores Di+1 and Di−1 in the memory 26a and memory 26b. Then, half of a difference between the Di+1 and Di−1 is added to a last Di so as to obtain correction Dp value. This Dp value is set in the workpiece bending simulation processing portion 24 as a new Di value.

Description of the Operation

Figure 1:
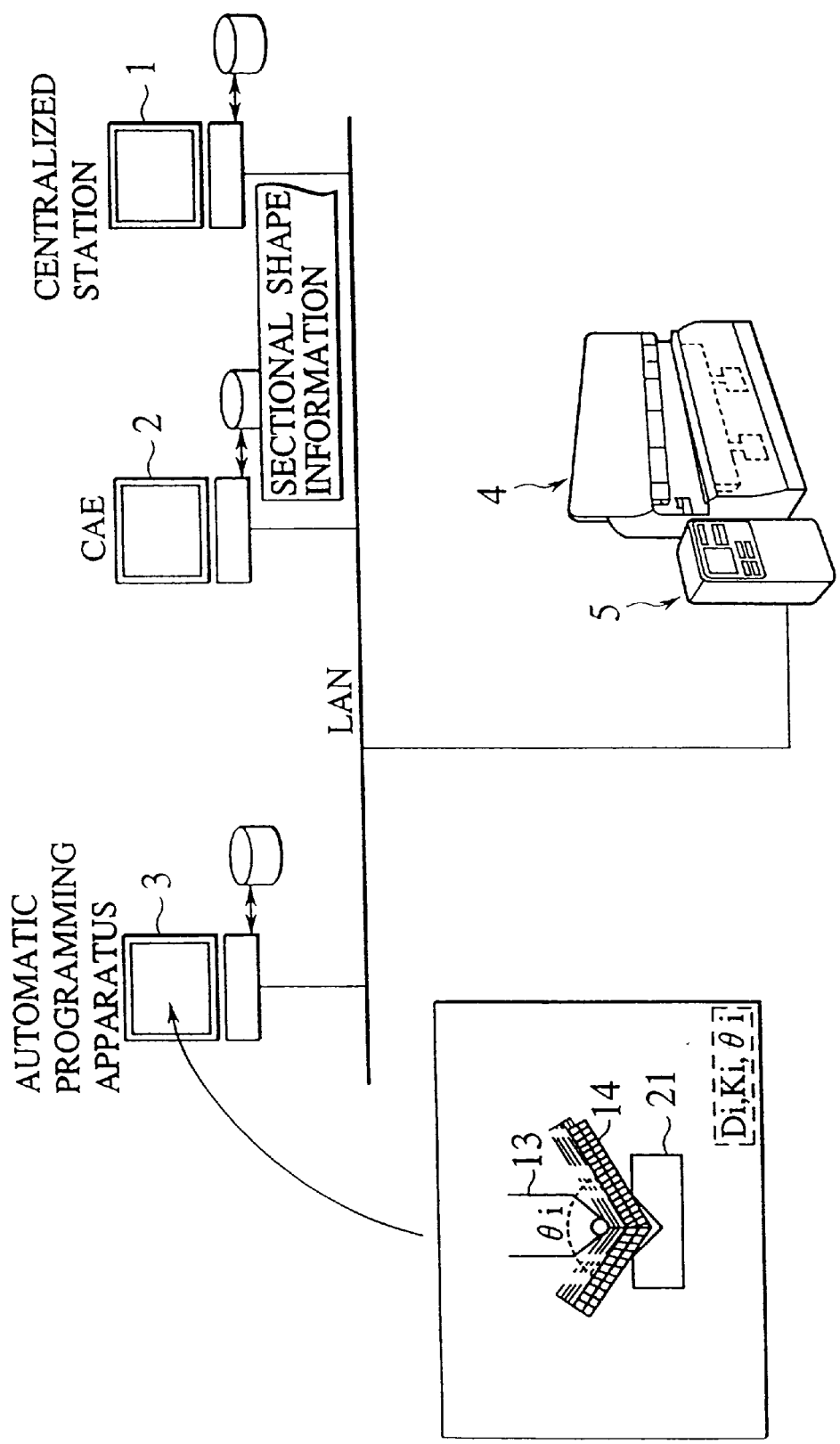
FIG. 1 is a schematic structure diagram of a production line control system for bending.
Figure 2:
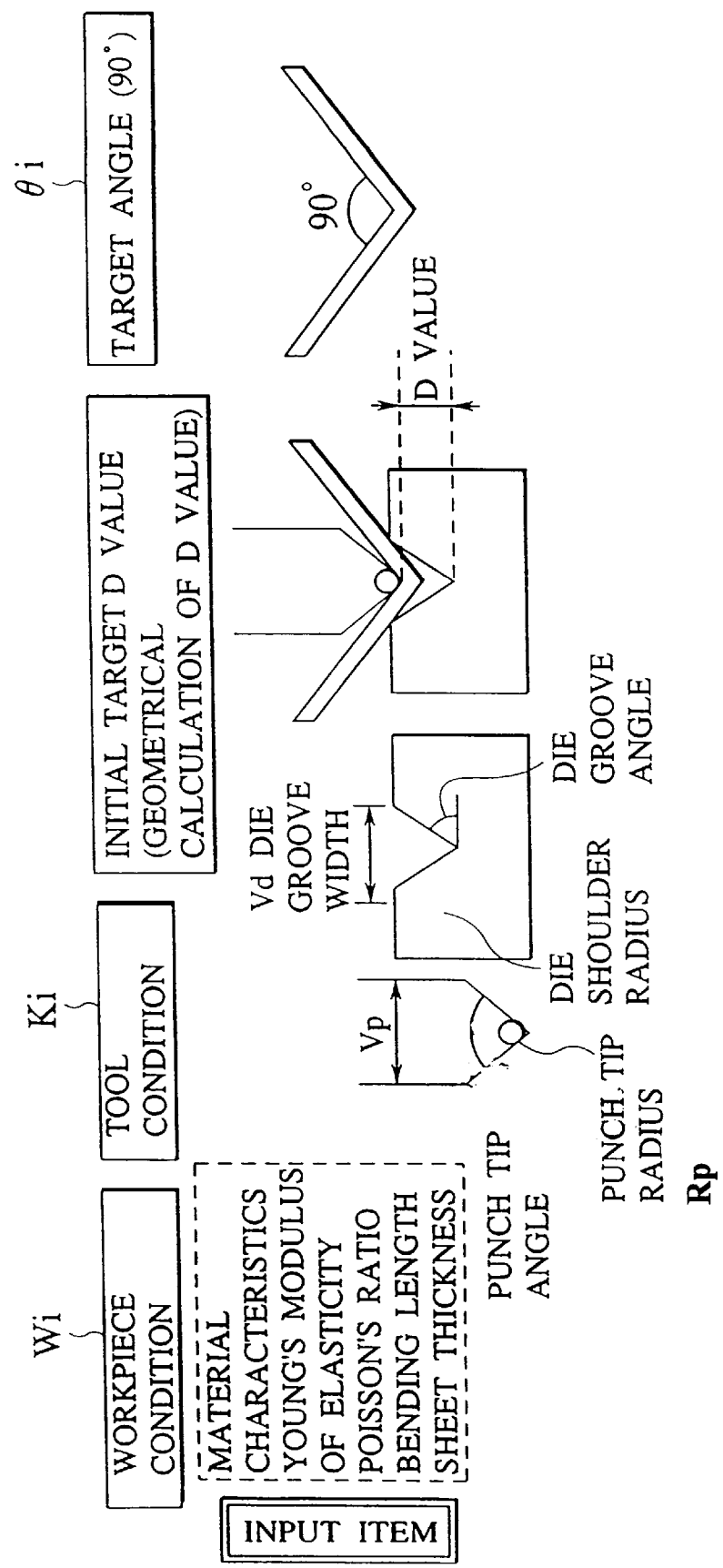
FIG. 2 is an explanatory view for explaining input condition.
Figure 6:
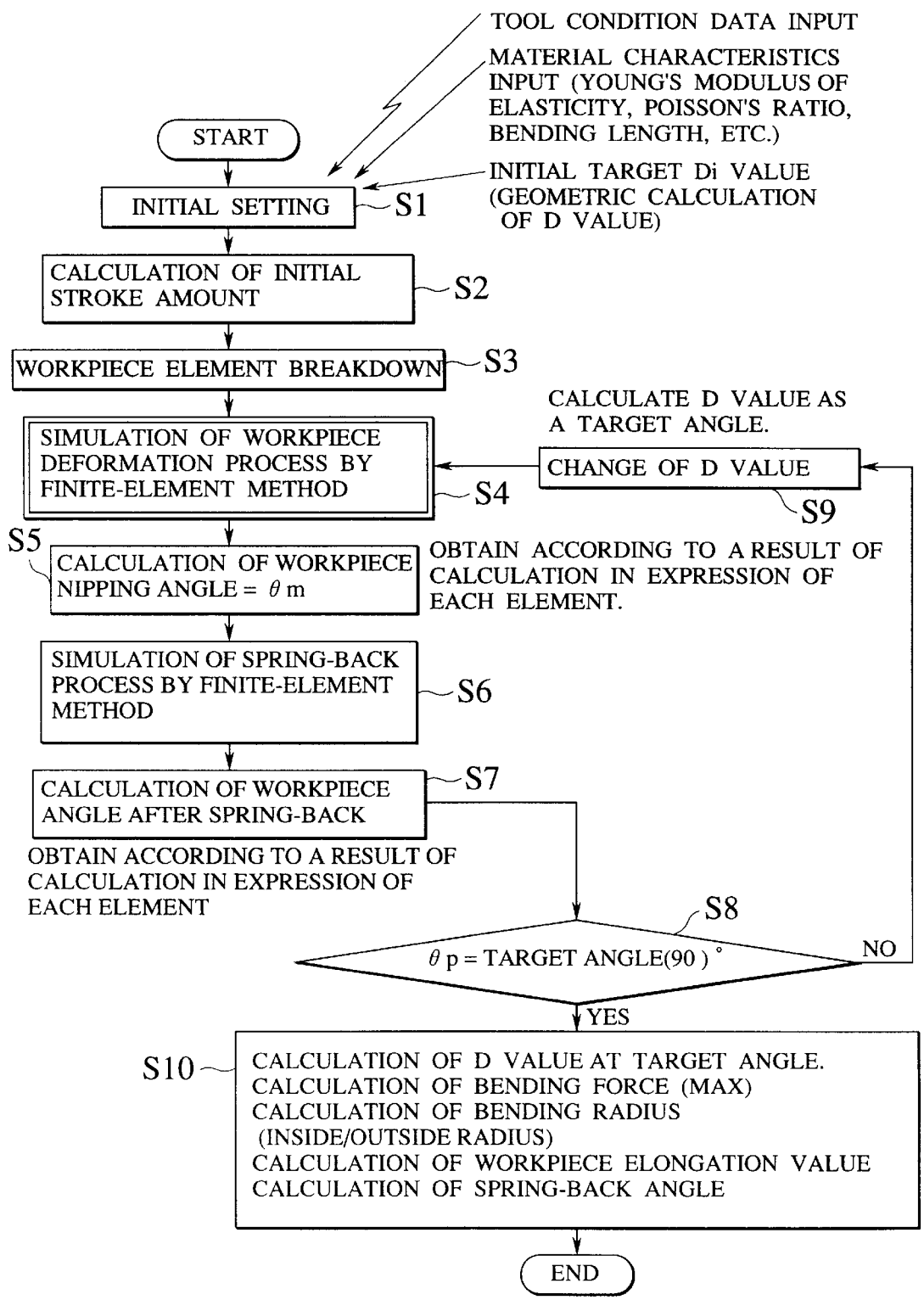
FIG. 6 is a flow chart showing processing steps for the bending simulation apparatus of the present invention.

An operation of the bending simulation apparatus having such a structure will be described according to a flow chart shown in FIG. 6. First, initial setting is performed (S1). The operator enters the bending information including the workpiece condition Wi, tool condition Ki, target angle θi and the like shown in FIG. 2. The bending information setting portion 22 sets this bending information Ji in the workpiece bending simulation processing portion 24.

Next, the target stroke amount calculation portion 21 obtains the target stroke amount (D value) according to this condition (S2).

Figure 3A:
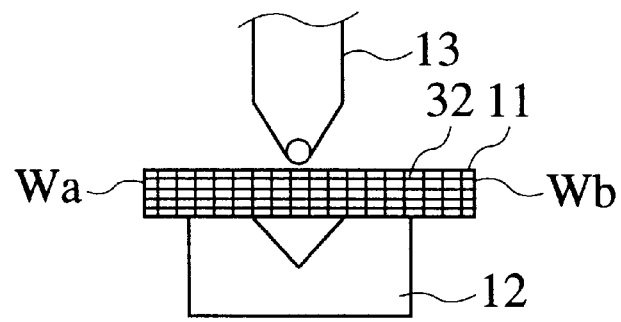
FIGS. 3A–3C are views showing angles of a workpiece depending on descent of a punch.
Figure 3B:
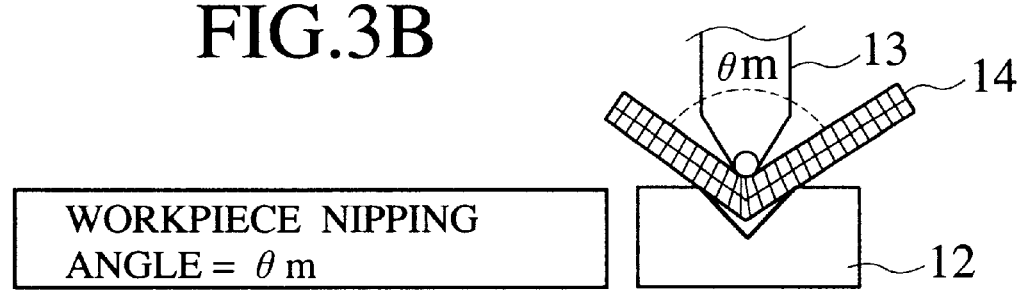
Figure 3C:
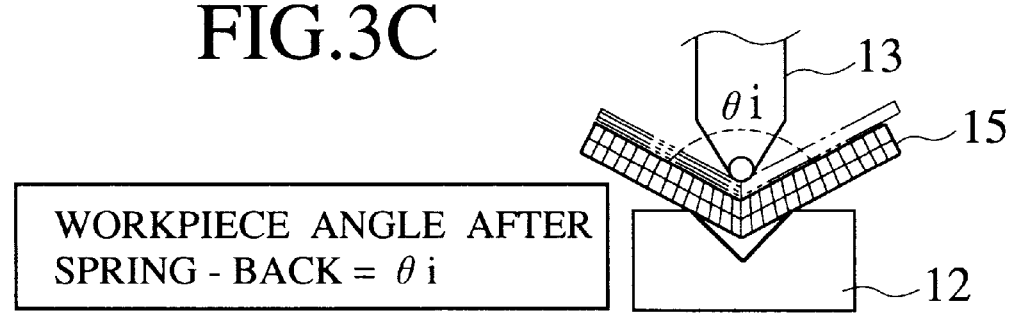

Next, the element breakdown calculation portion 23 breaks the workpiece sectional image 11 into elements as shown in FIG. 3A (S3).

In this mesh division, the simulation portion 242 reads the sheet thickness in the workpiece condition Wi and obtains division points Wa, Wb for dividing this sheet thickness into equal intervals. Then, it draws a horizontal line 32 connecting these points and simultaneously displays the aforementioned mesh in which the division points are connected.

Figure 7:
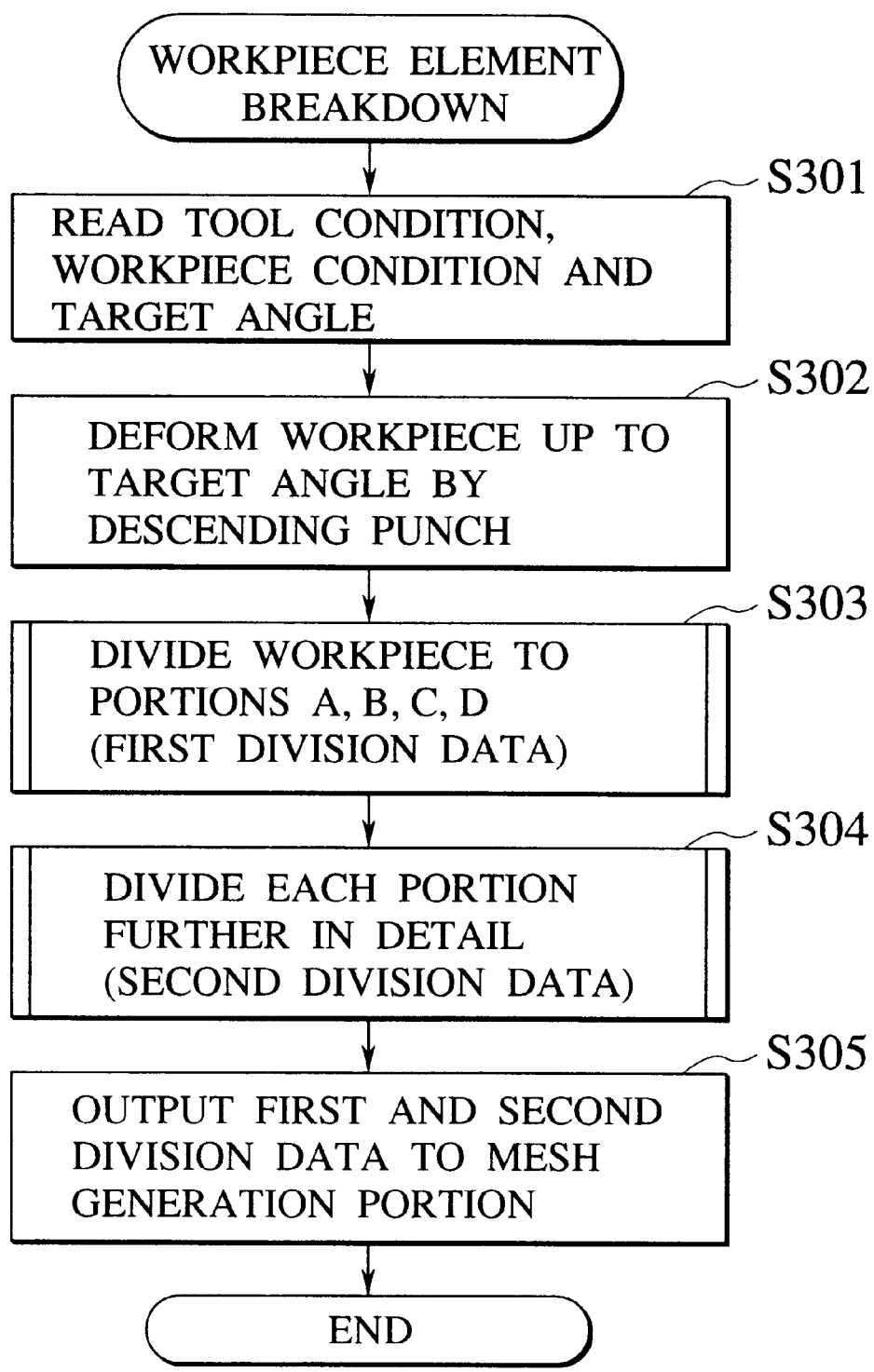
FIG. 7 is a flow chart showing processing steps for workpiece element breakdown.

Here, a processing operation of the element breakdown calculation portion 23 will be described in detail. FIG. 7 is a flow chart for explaining an operation of the element breakdown 35 calculation portion 23. The element breakdown calculation portion 23 reads inputted tool condition Ki and workpiece condition Wi (S301) and estimates a workpiece shape after deformation geometrically from these conditions (S302) For example, the workpiece is deformed as shown in FIG. 8.

Figure 8:
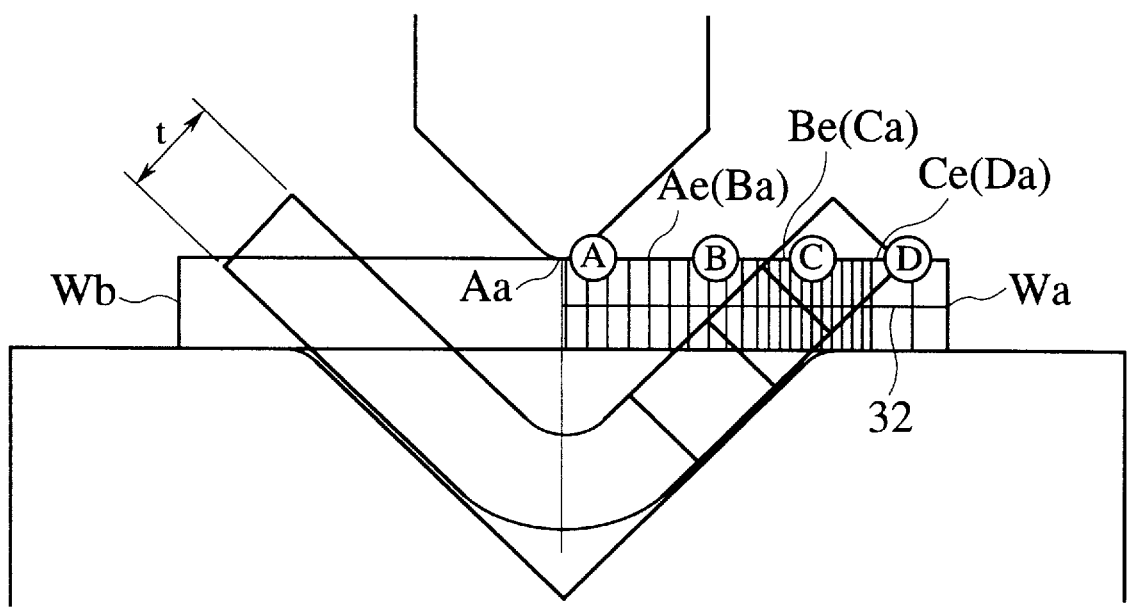
FIG. 8 is a view for explaining a first division data in workpiece element breakdown.

In this deformed workpiece, as shown in FIG. 8, geometrical expectation is performed by dividing to a portion which contacts the punch and is violently deformed (A), a portion which is not in contact with the punch (B), a portion which is in contact with a die shoulder (C) and an excessive portion (D) (S303). The division data of these portions is called first division data.

Figure 9A:
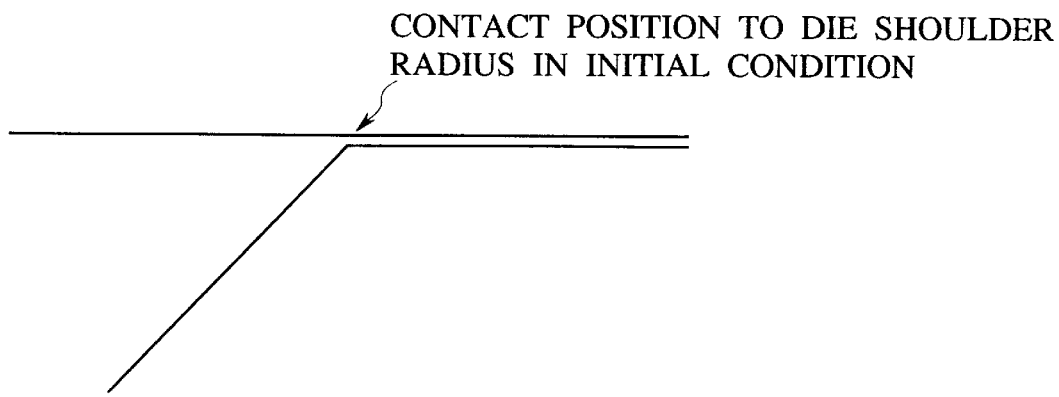
FIGS. 9A and 9B are views for explaining the portion (B) in the first division data.
Figure 9B:
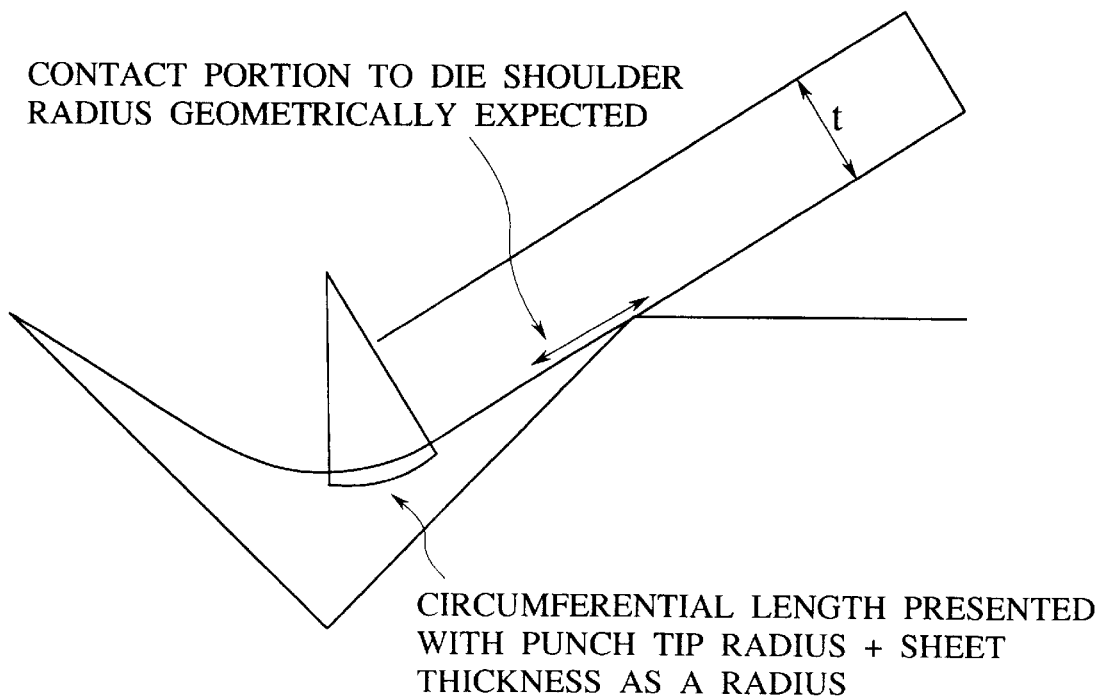
Figure 10:
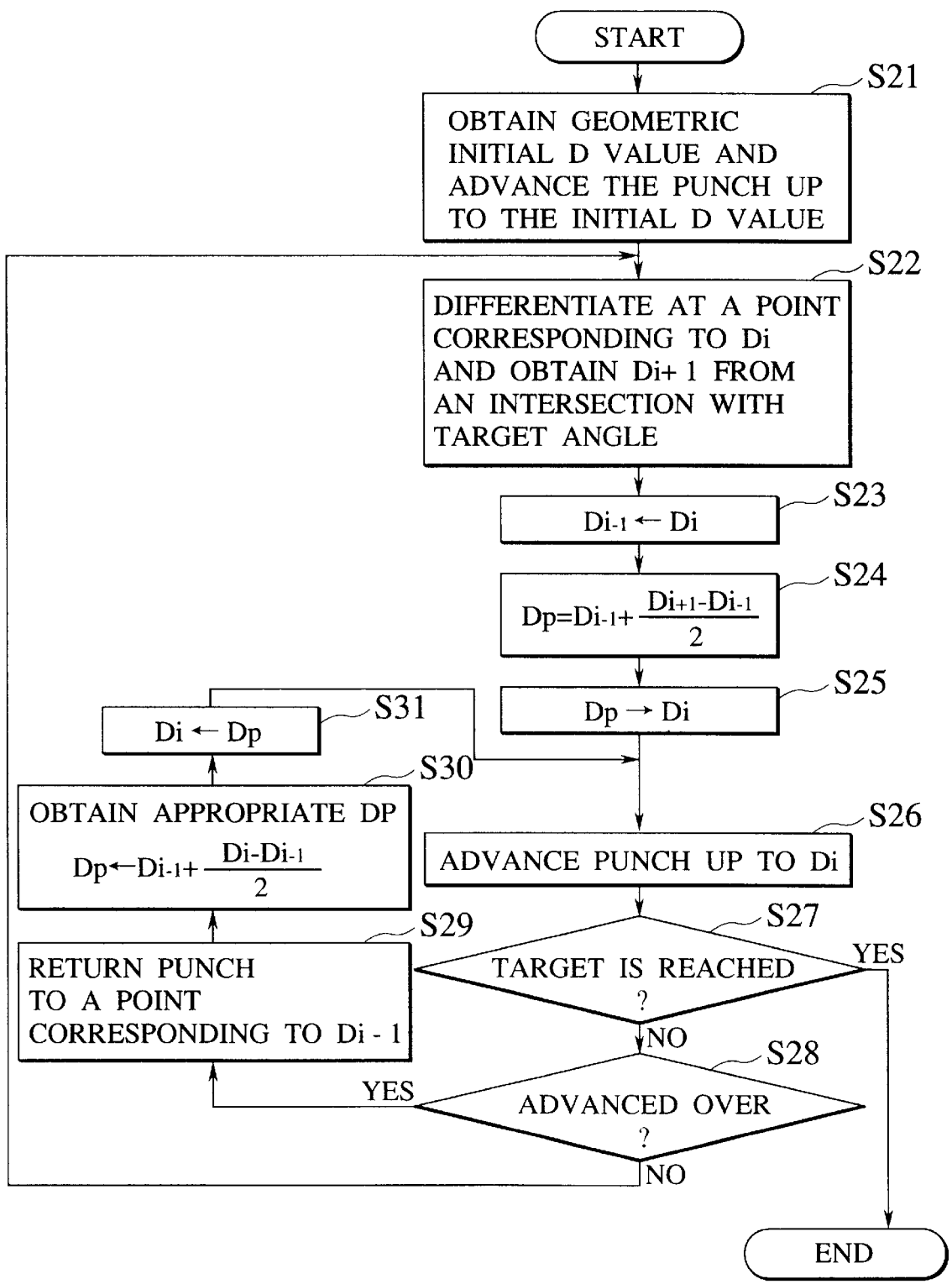
FIG. 10 is a flow chart showing processing steps in a target stroke amount determining portion and D-value correcting portion.

With respect to this first division data, as shown in FIGS. 9A and 9B, a length of the portion (A) is obtained by multiplying a circumferential length introduced from punch tip radius Rp plus sheet thickness t as a radius, with a predetermined coefficient. The length of the portion (B) is from an end point Ae of the portion (A) up to a beginning point Ca of the portion (C) as shown in FIG. 8. The length of the portion (C) is a length of geometrically estimated contacting portion against the die shoulder as shown in FIG. 9B, where an excessive value may be included.

The beginning point and end point of each portion are obtained in the following expressions (1)–(4) where the punch tip radius is Rp, sheet thickness is t, target angle is θ, V width is V and coefficient is K.

$$(A \text{ beginning point}) = 0 \tag{1}$$

$$(A \text{ end point}) = K(Rp+t)(90° - θ/2) \tag{2}$$

$$(C \text{ beginning point}) = V/2 \tag{3}$$

$$(C \text{ end point}) = (Rp+t)\left(90° - \frac{θ}{2}\right) + \frac{\left(\frac{V}{2} - (Rp+t)\sin\left(90° - \frac{θ}{2}\right)\right)}{\cos\left(90° - \frac{θ}{2}\right)} \tag{4}$$

Next, the element breakdown calculation portion 23 divides each of the portions (A, B, C, D) further in detail (S304). This division data is called second division data.

For example, as shown in FIG. 8, the portion (A) is divided to fine parts by multiplying the circumferential length of the punch tip radius with a coefficient (circumferential length of punch tip radius/K2 (K2: coefficient)) so as to correspond to deformation, the portion (C) is divided to a size of circumferential length divided by 3 so as to correspond to rolling/sliding contact with the die shoulder radius, and the portion (B) is divided to gradation like mesh so as to prevent an occurrence of concentration of stress or the like in terms of calculation due to an excessive difference of the division width between the portions (A) and (C). The portion (D) is divided appropriately because it is an excessive portion.

These second division data and the aforementioned first division data are outputted to the mesh generation portion 241 of the workpiece bending simulation processing portion 24 (S305).

The mesh generation portion 241, after drawing the horizontal line 32, divides the workpiece into mesh according to the first data which stores lengths of divided portions of the workpiece and generates a mesh obtained by further dividing each portion according to the second division data and displays that mesh.

This mesh data is transmitted to the simulation portion 242. The simulation portion 242 descends the punch sectional image 13 and carries out simulation for deforming each mesh according to the finite-element method.

That is, the mesh division is automatically performed. Thus, the deformation of a contact portion between the workpiece and punch is never different from its actual one and because each of the mesh intervals differs depending on deformation condition, contact condition and the like, calculation time never takes a so long time.

Next, while descending the punch sectional image 13, simulation of workpiece deformation process is carried out according to the finite-element method (S4). At this time, the angle θm in the workpiece sectional image 14 is obtained (S5).

Next, simulation of spring-back process is carried out according to the finite-element method (S6) and the deformation angle Om in the workpiece sectional image 14 is obtained (S5).

Next, simulation of the spring-back process is carried out according to the finite-element method (S6) and the deformation angle θp in the workpiece deformation image 15 after the spring-back is obtained (S7).

Next, the target stroke amount determining portion 25 determines whether or not the deformation angle θp coincides with the target angle θi (S8). In step S8, when it is determined that the angle θp of the workpiece after the spring-back occurs has not reached the target angle θi or 90 degrees for example, the target stroke amount determining portion 25 and D-value correcting portion 27 continues to correct the target stroke amount until the deformation angle θp coincide with the target angle θi.

Although this overlap the previous description, the target stroke amount calculation portion 21 obtains a geometric initial target stroke amount (or called initial Di value) and the workpiece bending simulation processing portion 24 proceeds the punch up to the initial Di value so as to deform the workpiece (S21).

Figure 11:
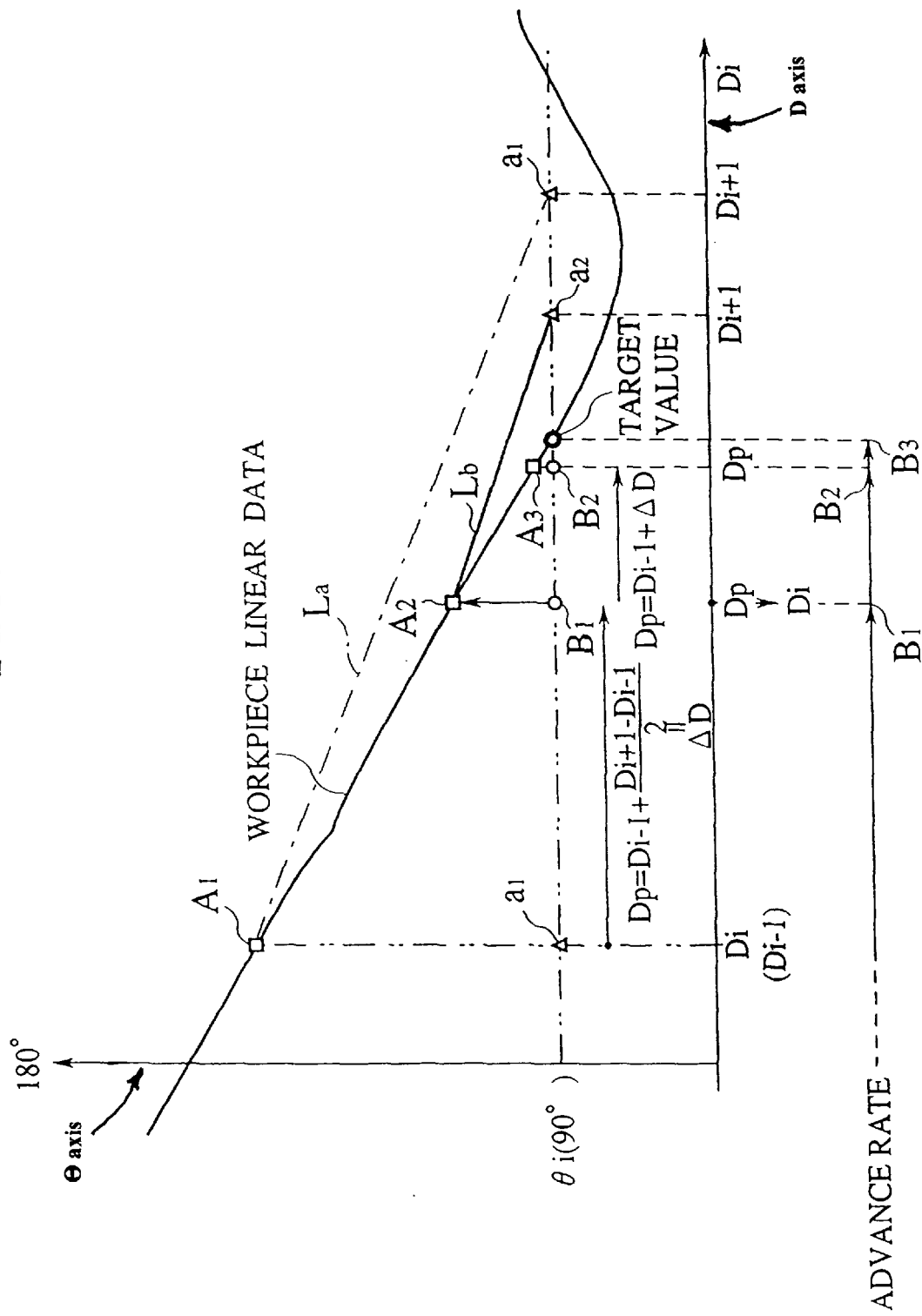
FIG. 11 is a diagram for explaining a processing in the D-value correcting portion.

Next, the D-value correcting portion 27 defines a diagram obtained by deforming the workpiece in coordinate system composed of the θ axis and D axis, as shown in FIG. 11 and by differentiating the diagram with Di, obtains Di+1 from an intersection with the target angle θp (S22). Then, the D-value correcting portion 27 stores Di in the memory 26b(S23) as a last Di (Di−1←Di).

In FIG. 11, differentiation is carried out at the point A1 of workpiece linear data at Di on the D axis and an intersection al (Di+1) between this differential line La and D-value axis is obtained.

Next, the D-value correcting portion 27 stores this Di+1 in the memory 27a. Then, the D-value correcting portion 27 adds Di−1 to half of a difference between Di+1 stored in the memory 27a and Di−1 stored in the memory 27b so as to obtain the correction value Dp (S24).

That is, the Di value obtained in the workpiece bending simulation processing portion 24 is corrected according to the following expression (5).

$$Dp=Di-1+((Di+1)-(Di-1))/2 \tag{5}$$

In FIG. 11, a middle point B1 between a last point a1 (Di−1) and the point al (Di+1) is the correction point Dp according to the expression (5).

Then, this correction value Dp is set in the workpiece bending simulation processing portion 24 as a new Di value (S25).

Next, the workpiece bending simulation processing portion 24 advances the punch up to this point (Di←DP) (S26). In FIG. 11, the punch is advanced up to B1.

Next, the target stroke amount determining portion 25 determines whether or not the punch reaches its target (S27). In step S27, when the punch reaches the target, the processing is terminated.

Unless the punch reaches the target in step S27, it is determined whether or not the punch has advanced over the target (S28).

If it is determined that the punch has advanced over the target in step S28, the punch is returned to the point Di−1 and an appropriate Dp value is obtained (S30). Then, this appropriate Dp is regarded as Di and the processing is returned to step S26.

This appropriate Dp value is a value obtained by adding half of a difference between Di and Di−1 to Di−1.

When it is determined that the punch did not advance over in step S28, the processing is returned to step S22. That is, with a point to which the punch is advanced or a new Di as a starting point, the processing after step S22 is repeated.

In FIG. 11, it is determined that the point B2 has not been advanced over and an intersection A3 between a vertical line at the point B2 and workpiece linear data is obtained. At this point A3, a differentiation line is obtained and then the processing after step S22 is repeated.

According to the present invention, Di−1 is added to half of a difference between Di+1 and Di−1 so as to obtain the correction value Dp. Arithmetic operation is carried out so as to advance the punch up to this correction value Dp. With reference to FIG. 11, for example, Di in which the target angle θi is attained, as shown on the bottom of this Figure, can be obtained by only three calculations B1, B2, B3.

Returning to FIG. 6, finally in step S10, the D value at the target angle is calculated and then a bending force (MAX), bending radius (inside/outside radius), workpiece elongation amount, and spring-back angle are calculated.

Here, calculation of workpiece elongation amount will be described in detail.

The elongation amount calculation portion 28 obtains a dimension of the workpiece sectional image 14 when the workpiece bending simulation processing portion 24 obtains an edge angle θp (target angle θi) by deforming the workpiece and obtains a difference between this dimension (provided with a number) and the dimension of the workpiece mounted on the die 9 so as to obtain the edge angle, as an amount of elongation α when the workpiece is bent at the target angle θi, and then transmits this elongation amount to the elongation amount subtraction portion 29. With transmission of this elongation amount α, numbers of sides of a solid form is also transmitted.

The elongation amount subtraction portion 29 reads a side of the solid form corresponding to this elongation amount α from a solid form generation portion (not shown) each time when the elongation amount α is obtained in the elongation amount calculation portion 28, and generates a solid form data by subtracting the elongation amount α from that side.

As described above, according to the simulation method of the present invention, finite-element method simulation is carried out according to entered respective conditions so as to automatically calculate the target stroke amount.

Therefore, the operator does not have to enter the initial target Di value again. Thus, the number of operator's work steps is decreased. Further, because the target stroke amount is automatically calculated considering an occurrence of the spring-back, even an operator not skilled in V-shape bending work and having no advanced processing know-how can attain a high precision target stroke amount.

Further, because the punch is advanced to the D value at small step value when a final D value is searched, it never pass excessively over that value.

Further, according to the present invention, by deforming the workpiece sectional image geometrically, the workpiece is divided to a portion subject to violent deformation, a portion which is not in contact with a tool, a portion which is in contact with a die shoulder, and an excessive portion. Then, the contact portion is divided most in detail, the non-contact portion is divided next in detail to mesh, and the portion subject to violent deformation is divided next to the excessive portion in detail. After this mesh division, simulation according to the finite-element method is carried out. Therefore, there is produced such an effect that the simulation process of bending is made to be coincident with actual bending and further the calculation time according to the finite-element method can be reduced.

It should be understood that many modifications and adaptations of the invention will become apparent to those skilled in the art and it is intended to encompass such obvious modifications and changes in the scope of the claims appended hereto.

What is claimed is:

1. A simulation method for virtually bending a workpiece, comprising:
   a) setting a workpiece condition of the workpiece to be bent, a tool condition and a target folding angle;
   b) obtaining a first target stroke amount of a punch according to the workpiece condition, the tool condition and the target folding angle;
   c) deforming the workpiece virtually, corresponding to a virtual descent of the punch by the first target stroke amount, and obtaining a deformation image of the workpiece after a spring-back according to an elasto-plasticity finite-element method based upon the workpiece condition, the tool condition and the target folding angle;
   d) determining whether a folding angle of the deformation image coincides with the target folding angle by comparing the folding angle and the target folding angle;
   e) when the folding angle and the target folding angle do not coincide in workpiece linear data showing a relationship between the target stroke amount and the folding angle of said deformation image under said first target stroke amount, automatically calculating, based upon the first target stroke amount considering the spring-back of the workpiece, a second target stroke amount so that the folding angle of the deformation image approaches the target folding angle by obtaining an intersection between a straight line obtained by differentiating at a point corresponding to the first target stroke amount and said target folding angle and setting a value located between a target stroke amount corresponding to said intersection and the first target stroke amount as the second target stroke amount;
   f) setting the first target stroke amount equal to the second target stroke amount;
   g) repeating steps c)–f) until the folding angle and the target folding angle coincide; and
   h) outputting information including the target stroke amount, spring-back amount, applied pressure and deformation shape.

2. A simulation method for bending according to claim 1 wherein a middle point between the target stroke amount corresponding to the intersection between the straight line obtained by differentiating at the point corresponding to the target stroke amount of this time, and said target folding angle, and the target stroke amount of this time is set as the new target stroke amount.

3. A simulation method for bending according to claim 2 wherein when a folding angle corresponding to said middle point deviates from said target folding angle, a middle point between the target stroke amount of this time and said middle point is set as the new target stroke amount.

4. A simulation method for virtually bending a workpiece, comprising:

a) setting a workpiece condition of the workpiece to be bent, a tool condition and a target folding angle;

b) obtaining a first target stroke amount of a punch according to the workpiece condition, the tool condition and the target folding angle;

c) deforming the workpiece virtually, corresponding to a virtual descent of the punch by the first target stroke amount and obtaining a deformation image of the workpiece after a spring-back according to an elasto-plasticity finite-element method based upon the workpiece condition, the tool condition and the target folding angle wherein, in said workpiece deformation image, the workpiece is divided into a portion which is subject to violent deformation, a portion which is in contact with a die shoulder, a portion extending between the portion which is subject to violent deformation and the portion which is in contact with the die shoulder, and an excessive portion;

d) determining whether a folding angle of the deformation image coincides with the target folding angle by comparing the folding angle and the target folding angle;

e) when the folding angle and the target folding angle do not coincide, automatically calculating, based upon the first target stroke amount considering the spring-back of the workpiece, a second target stroke amount so that the folding angle of the deformation image approaches the target folding angle;

f) setting the first target stroke amount equal to the second target stroke amount;

g) repeating steps c)–f) until the folding angle and the target folding angle coincide; and h) outputting information including the target stroke amount, spring-back amount, applied pressure and deformation shape.

5. A simulation method for bending according to claim 4, after the step for obtaining the initial value of the target stroke amount of said punch, further comprising the steps of:

dividing said portion which is subject to violent deformation by multiplying a circumferential length of a punch tip with a coefficient so as to correspond to the deformation; dividing said portion which is in contact with the die shoulder to a size of circumferential length divided by 3 so as to correspond to rolling/sliding contact with the die shoulder radius; and dividing said portion between said portion which is subject to violent deformation and said portion which is in contact with said die shoulder to gradation like mesh, so as to prevent an occurrence of concentration of stress in terms of calculation, due to an excessive difference of the division width between said portion which is subject to violent deformation and said portion which is in contact with said die shoulder.

* * * * *